(12) United States Patent
Feagan

(10) Patent No.: US 9,409,510 B1
(45) Date of Patent: Aug. 9, 2016

(54) AUTOMATIC TRACTOR/TRAILER TRACKING SYSTEM

(71) Applicant: Scott Feagan, Kanata (CA)

(72) Inventor: Scott Feagan, Kanata (CA)

( * ) Notice: Subject to any disclaimer, the term of this patent is extended or adjusted under 35 U.S.C. 154(b) by 176 days.

(21) Appl. No.: 14/080,392

(22) Filed: Nov. 14, 2013

(51) Int. Cl.
*G06F 17/00* (2006.01)
*B60Q 1/00* (2006.01)

(52) U.S. Cl.
CPC ........................................ *B60Q 1/00* (2013.01)

(58) Field of Classification Search
CPC ....................................................... G60Q 1/00
USPC ......................................................... 340/431
See application file for complete search history.

(56) References Cited

U.S. PATENT DOCUMENTS

| | | | |
|---|---|---|---|
| 6,054,779 A * | 4/2000 | Zubko | 307/10.8 |
| 6,466,028 B1 * | 10/2002 | Coppinger et al. | 324/504 |
| 6,529,529 B1 | 3/2003 | Tohkairin | |
| 6,799,814 B2 | 10/2004 | Lesesky | |
| 8,068,019 B2 | 11/2011 | Bennie | |
| 2002/0016086 A1* | 2/2002 | Kinsey | 439/34 |
| 2006/0085099 A1* | 4/2006 | Burlak et al. | 701/1 |

\* cited by examiner

*Primary Examiner* — Brent Swarthout
(74) *Attorney, Agent, or Firm* — Albert O. Cota

(57) ABSTRACT

An automatic tractor/trailer tracking system (ATTS) that functions in combination with a power connector and an electronic circuit. The power connector has a hinged cover which can be positioned in either a closed vertical position or in an open horizontal position. The electronic circuit interfaces with the hinged cover such that when the cover is placed in an open position the attached electronic circuit is enabled. The enabled electronic circuit produces asset a set of trailer status signals that are sent by a wireless means to a remote receiver where the signals are reviewed.

2 Claims, 2 Drawing Sheets

AUTOMATIC TRACTOR/TRAILER TRACKING SYSTEM

TECHNICAL FIELD

The invention generally pertains to systems that monitor the status and location of a tractor/trailer, and more particularly to an automatic tractor/trailer tracking system that provides the identification and the location of a particular trailer.

BACKGROUND ART

To properly manage a fleet of tractor/trailers is necessary to provide real time data on the location of each tractor and trailer, the time and location of where and when a trailer is tethered or un-tethered and the identification of the trailer and the tractor pulling the trailer. Typically, it is the responsibility of the tractor driver to identify and provide the data via an asset tracking management system. This system is prone to errors due to potential misreading the tractor's or trailer's identification, damaged labeling or identification plates, theft, or human error.

Other prior art systems communicate the required data automatically to the tractor via a hard-wired connection through an anti-lock braking system using a Power Line Carrier (PLC) communication bus. This system requires the installation of a complex and expensive PLC transceiver on both the trailer and on the tractor.

Wireless trailer identification systems have also been used in combination with a Tire Pressure Monitoring Systems (TPMS). These systems have a long event reporting latency time since the system is not active unless the trailer gets power and the trailer starts moving.

A search of the prior art did not disclose any literature or patents that read directly on the claims of the instant invention. However, the following U.S. patents are considered related:

| U.S. PAT. NO. | INVENTOR | ISSUED |
|---|---|---|
| 8,068,019 | Bennie | 29 Nov. 2011 |
| 6,799,814 | Lesesky | 5 Oct. 2004 |
| 6,529,529 | Tohkairin | 4 Mar. 2003 |

The U.S. Pat. No. 8,068,019 discloses a system that upon connection of a trailer to a tow vehicle, recognizes the trailer and applies a stored trailer configuration in a controller. In one embodiment, tire pressure sensors transmit RF signals that are received by the tire pressure monitoring system (TPMS). Transmission from the sensor are decoded in a controller and processed to identify a particular trailer configuration.

The U.S. Pat. No. 6,799,814 discloses the status of one or more subsystems positioned on one or more trailer is communicated to a tractor electrically and mechanically connected to the trailer. The status is automatically supplied by the subsystem or can be requested either by the operator of the tractor/trailer combination or automatically by another subsystem on either the tractor or the trailer. These systems require the installation of complex and expensive Power Line Carrier (PLC) transceivers on the trailers and on the tractors.

The U.S. Pat. No. 6,529,529 discloses an automatic tracking system that utilizes a multiplicity device for reducing the time period during which a signal is formatted that is applied to a relay exchange mode. This system requires the use of a complex system of sensors and transmitters. The system also fails to properly identify the exact time and location of a hook/unhook event as well as the identification of the tracker/trailer.

DISCLOSURE OF THE INVENTION

The automatic tractor/trailer tracking system (ATTS) is designed to produce and provide to a receiver located in a tractor cab, on a trailer or in a dispatch office data pertaining to the location, date, and time that a trailer is tethered or un-tethered from a tractor.

The ATTS is comprised of an electronic circuit that functions in combination with a power connector or the like, that includes a hinged cover. The cover is either in a closed vertical position or in an open horizontal position which allows access to the connector.

The electronic circuit is attached to the connector cover and is comprised of a microcontroller enabled by a battery that is controlled by a switching unit. When the cover is opened the microcontroller is enabled and data pertinent to the trailer is applied to a short range RF transmitter that sends the data, via an RF antenna, to, the tractor cab, the trailer and/or to a dispatch office.

The electronic circuit is located on a single printed circuit board (PCB) that, in turn, is enclosed in a hermetically sealed enclosure which is attached typically by screws to the inside cover of the power connector. The placement of the electronic circuit on the cover allows the movement of the cover from either a closed to an open position or from an open to a closed position which are then detected and applied to the transmitter.

In view of the above disclosure the primary object of the invention is to provide an ATTS that wirelessly and automatically sends data to a receiver that pertains to the time, date and the connectivity status of the trailer.

In addition to the primary object of the invention it is also an object of the invention to produce an ATTS that:
- can be applied to various tractor/trailer combination,
- is easily maintained,
- is reliable,
- can be designed to be attached to fit a variety of power connector,
- can be processed as an aftermarket product or an OEM product,
- avoids situations where a trailer is attached to the wrong tractor, and
- is cost effective from both a manufacturer's and fleet's point of view.

These and other objects and advantages of the present invention will become apparent from the sub sequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred embodiment of an automatic tractor/trailer tracking system (ATTS). The ATTS is designed to identify and provide the status of a particular trailer assigned to a particular tractor.

The preferred embodiment of the ATTS 10 is comprised of an electronics circuit 20 that functions in combination with a trailer attached power connector 12 such as a SAE J560 7-pin connector and a tractor. The power connector 12, as shown in FIG. 12, includes a hinged cover 14 that is in either a closed vertical position, or in an open horizontal position in which position a power cable can be connected from the power connector 12 to a tractor. The power connector 12 can be comprised of any power connector having a hinged cover 14 such as a data communication connector or an air hose connector.

Figure 2:
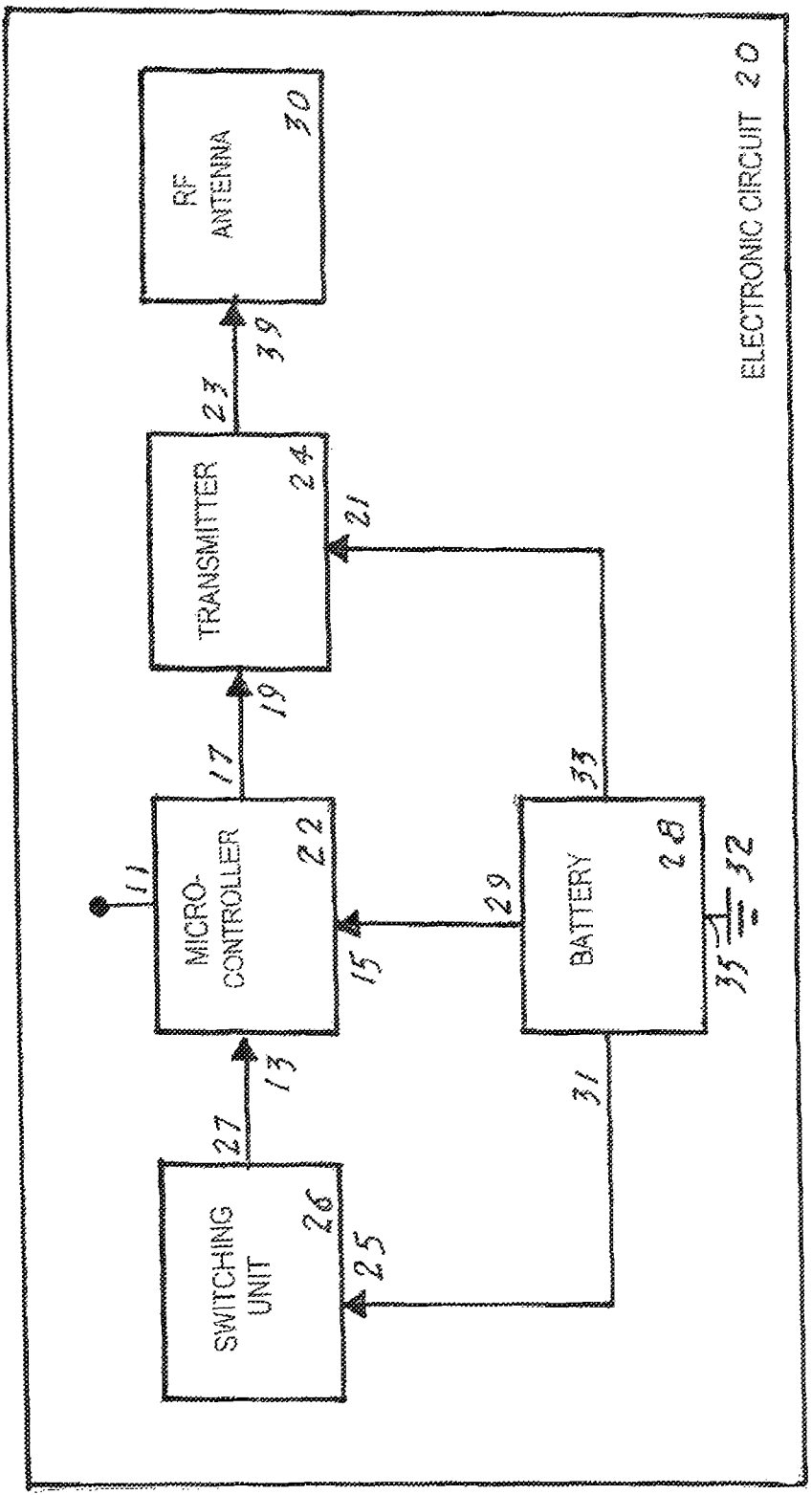
FIG. 2 is a block diagram of a typical ATTS electronic circuit.

The electronic circuit 20, as typically shown in FIG. 2, is comprised of a microcontroller 22, a transmitter 24, a switching unit 26, a battery 28, and a radio frequency (RF) antenna 30.

The microcontroller 22 has a first input 11, a second input 13, a third input 15 and an output 17. Prior to installing the ATTS 10, a set of preset signals which include a unique identification of a specific trailer and a specific microcontroller 22 are programmed into the non-volatile memory of the microcontroller 22 via the first input 11. The transmitter 24, which is comprised of a short range transmitter, has a first input 19, a second input 21 and an output 23. The first input 19 is connected to the second output 17 of the microcontroller 22. The switching unit 26 has an input 25 and an output 27. The output 27 is connected to the second input 13 on the microcontroller 22. The switching unit 26 can consist of an accelerometer, a tactile button switch, a toggle switch, a tilt switch, a magnetic reed switch, an optically coupled switch and a near field communication (NFC) receiver coil.

Figure 1:
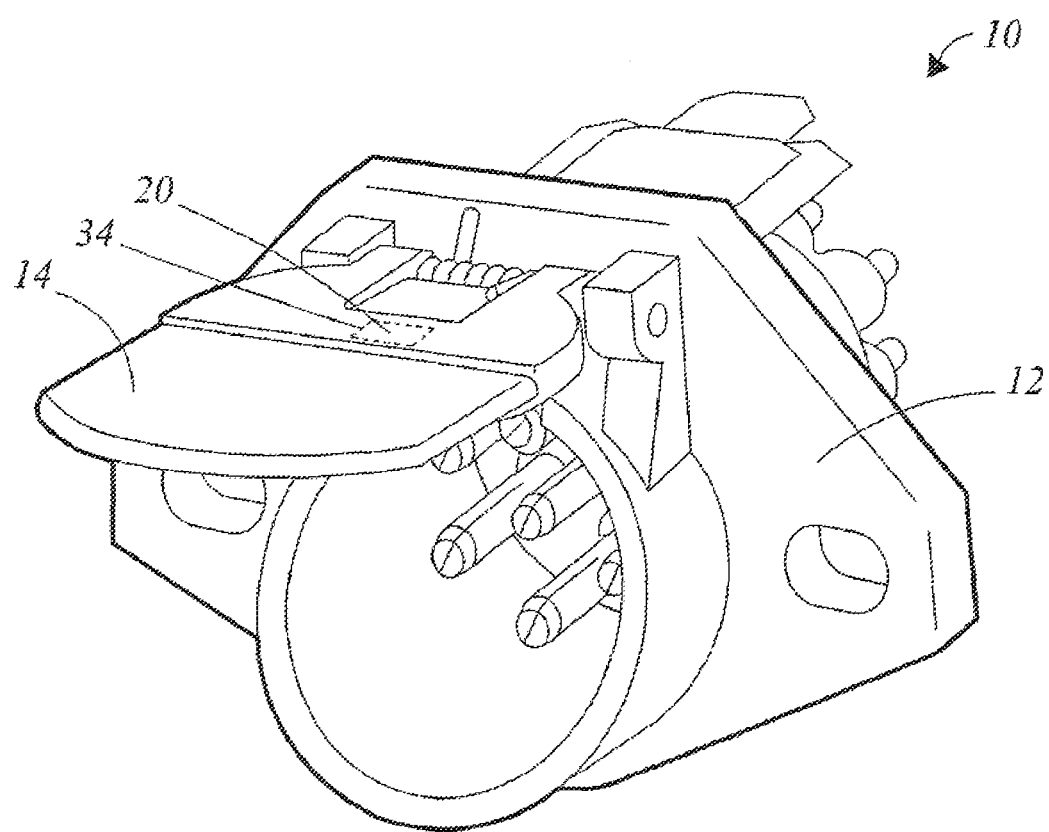
FIG. 1 is a front isometric view of a typical power connector having attached to its hinged cover an ATTS

The electronic circuit 20 is attached by an attachment means 34, as shown in FIG. 1, to a trailer's structural member that interfaces with the hinged cover 14 of the power connector 12 or directly on the cover 14. When the cover 14 is closed, the switching unit 26 is open indicating that the trailer is not tethered to a tractor. When the over 14 is open, the switching unit 26 is closed indicating that the trailer is or can be tethered to the tractor.

The battery 28 provides the power that enables the electronic circuit 20, as shown in FIG. 2. The battery 28 has a first output 29 connected to the third input 15 of the microcontroller 22, a second output 31 connected to the input 25 of the switching unit 26, a third output 33 connected to the second input 21 of the transmitter 24 and a fourth output 35 connected to circuit ground 32.

The output 23 from the transmitter 24 is connected to the input 39 on the RF antenna 30 from where a set of trailer status signals are automatically and wirelessly transmitted to a designated RF receiver (not shown). The set of trailer status signals comprise:

trailer identification,
cover position status (up, down, moving up, moving down), and
battery status.

As previously described, the power connector 12 has a hinged cover 14 that can be positioned in either a closed vertical position or an open horizontal position.

When the hinged cover 14 transitions from a closed position to an open position, the switching unit 26 closes, thereby causing power from the battery 28 to be applied to the third input 15 which enables the microcontroller 22. The microcontroller 22 then sends, via the transmitter 24 and the RF antenna 30, the trailer status signals to the tractor connected to the trailer and/or to a remote location. To conserve power, the output from the transmitter 24 is periodically transmitted and controlled by the microcontroller 22.

When the hinged cover 14 transitions from an open position to a closed position, the switching unit 26 opens, causing the power from the battery 28 from being applied to the microcontroller 22. The microcontroller 22 then goes into a sleep mode which is maintained until the cover transitions from the closed position to the open position.

When the cover is initially placed in a closed position the microcontroller 22 goes into a steady state mode. In this mode, the microcontroller 22 keeps sending the trailer status signals for a selectable period of time, after which the microcontroller goes into a sleep mode.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. An automatic tractor/trailer tracking system ATTS that functions in combination with a power connector attached to a front structure of a trailer and a tractor, wherein the power connector has a hinged cover that is either in a closed vertical position or in an open horizontal position, and a remote receiver, wherein said ATTS is comprised of an electronic circuit comprising,
   a) a microcontroller having a first input, a second input, a third input and an output,
   b) a set of preset signals applied to the first input of said microcontroller,
   c) a transmitter having a first input, a second input and an output, wherein the first input is connected to the second output of said microcontroller,
   d) a switching unit having an input and an output, wherein the output is connected to the second input of said microcontroller,
   e) a battery having a first output connected to the third input of said microcontroller, a second output connected to the input of said switching unit, a third output connected to the second input of said transmitter, and a fourth output connected to circuit ground, and
   f) an RF antenna connected to the output of said transmitter, wherein when the hinged cover of the power connector transitions from the closed vertical position to the open horizontal position, said switching unit closes, causing power from said battery to enable said microcontroller, thereby causing said microcontroller to wirelessly and automatically send via said transmitter and said RF antenna a set of trailer status signals to the remote receiver.

2. An automatic tractor/trailer tracking system ATTS that functions in combination with a power connector attached to a front structure of a trailer and a tractor, wherein the power connector has a hinged cover that is either in a closed vertical position or in an open horizontal position, and a remote receiver, wherein said ATTS is comprised of an electronic circuit comprising,
   a) a microcontroller having a first input, a second input, a third input and an output,
   b) a set of preset signals applied to the first input of said microcontroller,
   c) a transmitter having a first input, a second input and an output, wherein the first input is connected to the second output of said microcontroller, d) a switching unit having an input and an output, wherein the output is connected to the second input of said microcontroller, e) a battery having a first output connected to the third input of said microcontroller, a second output connected to the input of said switching unit, a third output connected to the second input of said transmitter, and a fourth output connected to circuit ground, and f) an RF antenna connected to the output of said transmitter, wherein when the hinged cover of the power connector transitions from an open horizontal position to a closed vertical position, said switching unit opens, causing the power from said battery to not be applied to said microcontroller, wherein said microcontroller goes into a sleep mode which is maintained until the hinged cover transitions from the closed vertical position to the open horizontal position.

* * * * *